United States Patent [19]

Tishel

[11] Patent Number: 5,595,775
[45] Date of Patent: Jan. 21, 1997

[54] METHOD FOR PRESERVING FRESH FRUIT AND VEGETABLE

[75] Inventor: Moshe Tishel, Kfar Bilu, Israel

[73] Assignee: Analyst Ltd., Israel

[21] Appl. No.: 540,944

[22] Filed: Oct. 11, 1995

[30] Foreign Application Priority Data

Nov. 10, 1994 [IL] Israel ......................................... 111234

[51] Int. Cl.⁶ .................................. A23B 7/00; A23L 3/00
[52] U.S. Cl. ........................... 426/241; 426/524; 426/615
[58] Field of Search ...................................... 426/241, 524, 426/615, 321

[56] References Cited

U.S. PATENT DOCUMENTS 4,510,163  4/1985  Gejl-Hansen ............................ 426/241

Primary Examiner—George Yeung
Attorney, Agent, or Firm—Brumbaugh, Graves, Donohue & Raymond

[57] ABSTRACT

A method for the preservation of fresh fruit and vegetable comprising treating whole or cut pieces of said fruit or vegetable with microwaves at a temperature not exceeding 45° C. and subsequently freezing the treated fruit or vegetable for a desired period of time.

10 Claims, No Drawings

METHOD FOR PRESERVING FRESH FRUIT AND VEGETABLE

FIELD OF THE INVENTION

The present invention relates to a method for preservation of fruit and vegetable. It relates especially to delicate fruit which are impaired by freezing such as mango, papaya, pineapple, persimmon and avocado.

BACKGROUND OF THE INVENTION

When a conventionally frozen fruit is thawed a dark, soft, mushy product is often obtained. Moreover above disadvantages are often accompanied by "bleeding" of liquid from the thawed tissue, a phenomenon which is also known as drip loss.

Heat treatment of frozen food prior to freezing has been suggested in the past; however, none of the known methods was able to significantly overcome the negative effects of freezing on fruits and vegetables and most of the suggested methods actually imparted cooked characteristics to the food products.

Dehydrofreezing of peeled fruits has been suggested, such as in Canada Patent no. 1,275.196, wherein prior to freezing the fruit pieces were blanched in water at a temperature ranging from 85° C. to 95° C. and subsequently dried by means of hot air at a maximum temperature of 60° C., until the weight of fruit pieces were reduced to substantially half the weight.

Israel Patent nos. 41493 and 41494 disclose dehydrofreezing processes for peeled bananas and cut avocado respectively, which are dehydrated prior to freezing in a forced draft drier in a tunnel oven. However, a treatment of bananas and avocado in air convection ovens forms a "skin" on the outer surface of the freshly diced fruit—the phenomenon is also related to as formation of case hardening. Case hardening is easily detected by the consumer who declines using such treated product.

Microwave treatment of frozen food prior to freezing has been disclosed in the past, such as in Chemical Abstract 44643r or chemical Abstract 157043h. However, above publications disclose microwave blanching, that is a brief scalding in order to lower microbial count and reduce enzyme activity, or in order to impart cooked characteristics on the final product. Similarly EP Patent no. 72878 discloses a process for preparing frozen diced food suitable for pets in which the foodstuff is first treated with microwaves which raise the temperature at the center of the foodstuff to at least 75° C.

It is the object of the present invention to provide frozen fruit and vegetable in which the thawed tissue will retain a fairly normal texture and flavor and thus the organoleptic characteristics be maintained.

SUMMARY OF THE INVENTION

In accordance with the invention there is provided a method for the preservation of fresh fruit and vegetable comprising treating whole or cut pieces of said fruit or vegetable with microwaves at a temperature not exceeding 45° C. and subsequently freezing the treated fruit or vegetable for a desired period of time.

The invention also provides an additional treatment to fruit and vegetable sensitive to darkening wherein such fruit is treated with an antibrowning agent prior to treatment with microwave. Any known antibrowning agent may be used. A preferred antibrowning agent is sodium disulfite.

The amount of water removed from the fruit or vegetable during the microwave treatment is preferably from 5% to 40% by weight, based on total weight of the fruit or vegetable.

The method is applicable to all fresh fruits and vegetables, however, it is preferable to apply the method to delicate fruit or vegetable which commonly change their texture, color or taste after freezing, such as mango, papaya, pineapple, persimmon, avocado, strawberry and the like.

The microwave power used may vary from 0.5 KW to 250 KW and the frequency from 800 to 3000 MHz.

The microwave treatment may be carried out in any known microwave unit which allows the control of temperature, so as not to exceed 45° C.

DETAILED DESCRIPTION OF THE INVENTION

The invention is illustrated in more detail by the following non-limiting examples.

EXAMPLE 1

Avocado pears of the Haas variety were halved and depitted. They were then immersed in a 3% sodium disulfite solution for 15 minutes. After being removed from the solution the avocado halves were left dripping for another 10 minutes.

18.5 kg of avocado halves were placed on trays and were run through a 2 KW microwave dehydration tunnel (2450 MHz). A weight loss of 6.5% was recorded. Temperature in the tunnel was 18°–25° C.

The fruit was frozen in nitrogen at −60° C. and stored at −20° C.

The product obtained after thawing has an excellent texture, a natural color and natural flavor.

EXAMPLE 2

Avocado pears of the Haas variety were halved and depitted. They were then immersed in a 3% sodium disulfite solution for 15 minutes. After being removed the avocado halves were left dripping for another 10 minutes. 16.1 kg of avocado halves were placed on trays and were run through a 2 KW microwave dehydration tunnel (2450 MHz). A weight loss of 7.9% was recorded. Temperature in the tunnel was 33° C.

The fruit was frozen at −40° C. in a freezing tunnel and was stored at −20° C. The thawed product has an excellent texture, a natural color and flavor.

EXAMPLE 3

Avocado pears of the Haas variety halved and depitted and peeled. The avocado halves were then sliced into 1 cm thick slices. They were then immersed in a 3% sodium disulfite solution for 15 minutes. After being removed, the avocado halves were left dripping for another 10 minutes.

Five kg of avocado halves were placed on trays and were run through a 2 KW microwave dehydration tunnel (2450 MHz). A weight loss of 21% was recorded. Temperature in the tunnel was 33° C.

The fruit was frozen at −40° C. in a freezing tunnel and was stored at −20° C. The thawed product has an excellent texture, a natural color and flavor.

EXAMPLE 4

Pineapple fruit of the Queen and Qayene varieties were peeled and cored by a semiautomatic machine and sliced by a bread slicer.

The pineapple rings, thus obtained, were placed in a continuous 2 KW microwave tunnel. The temperature in the tunnel 22° C.

1750 g of the Queen variety after treatment lost 13% of their weight.

4300 g of the Qayene variety lost 13.5%.

The fruit was frozen at −60° C. and stored at −20° C.

The thawed slices had an excellent aroma, appearance and texture.

EXAMPLE 5

Papaya fruit were peeled and deseeded. Cubes of about 2.5×1.5×1.5 cm were prepared. The cubes arranged on trays passed in a continuous 2 KW microwave dehydration tunnel. Tunnel temperature did not exceed 25° C.

A 23% weight loss was recorded.

The fruit were frozen by nitrogen at −60° C. and were stored at −20° C.

The thawed cubes retained their appearance, texture and aroma.

EXAMPLE 6

Mango fruit of the Haiden and Maya varieties were peeled and sliced. The fruit arranged on trays was treated in a 2 KW microwave tunnel. Tunnel temperature did not exceed 35° C.

12.3 kg slices were treated and an average weight loss of 20% was recorded. The fruit was frozen at −35° C. and stored at −20° C.

Thawed fruit retained their aroma and appearance.

EXAMPLE 7

Three lots of melon fruit of the Galia variety, each weighing about 700 gr., underwent three different treatments (for comparative purpose).

Microwave treatment—the melon cubes were treated as in example 6.

Conventional tunnel treatment—the melon cubes were treated in an air convection oven. Oven temperature did not exceed 35° C., and a 20% weight reduction was recorded.

Control—the melon cubes were untreated except for freezing.

After the treatment each of the lots was frozen in a nitrogen freezer at −50° C. and was stored at −18° C. After a prolonged storage, about 25 gr of each speciman was thawed. Drip loss was determined and possible formed "skin" was separated. The results are summarized in table 1.

TABLE 1

|  | Drip loss % | peelable skin % |
|---|---|---|
| Control | 33 | 0 |
| Microwave | 16 | 1 |
| Conventional | 17 | 6.4 |

EXAMPLE 8

Three lots of peeled and sliced banana fruit were treated as described in example 7. The results are summarised in table 2.

TABLE 2

|  | Drip loss % | peelable skin % |
|---|---|---|
| Control | 12.5 | 0 |
| Microwave | 0.76 | 2 |
| Conventional | 0.4 | 20 |

I claim:

1. A method for the preservation of fresh fruit and vegetable comprising treating whole or cut pieces of said fruit or vegetable with microwaves at a temperature not exceeding 45° C. and subsequently freezing the treated fruit or vegetable for a desired period of time.

2. A method according to claim 1 wherein the fruit or vegetable is peeled prior to treatment with microwaves.

3. A method according to claim 1 wherein the fruit or vegetable is treated with an antibrowning agent prior to treatment with microwaves.

4. A method according to claim 1 wherein the fruit or vegetable is treated with sodium disulfide prior to treatment with microwaves.

5. A method according to claim 1 wherein upon treating fruit or vegetable with microwaves the amount of water removed from said fruit or vegetable is from 5% to 40% by weight based on total weight of fruit or vegetable.

6. A method according to claim 1 wherein the fruit or vegetable is treated in a microwave dehydration tunnel.

7. A method according to claim 1 wherein the microwaves have a power ranging from 0.5 KW to 250 KW and a frequency ranging between 800 to 3000 MHz.

8. A method according to claim 1 wherein the freezing of the microwave treated fruit or vegetable is first carried out at temperature below −30° C. and subsequently the frozen fruit or vegetable is stored at a temperature not exceeding −15° C.

9. A method for the preservation of fresh avocado according to claim 1 which comprises the following steps:

a) cutting the avocado to at least two pieces and removing the pit;

b) treating the avocado pieces with an antibrowning agent;

c) treating the avocado pieces with microwaves at a temperature not exceeding 45° C. to remove an amount of water ranging between 5 to 15% of total weight;

d) freezing the microwave treated avocado at a temperature below −30° C. and subsequently storing the avocado at a temperature not exceeding −17° C.

10. A frozen fruit or vegetable which is treated by microwaves at a temperature not exceeding 45° C. prior to freezing according to claim 1, wherein upon thawing said frozen fruit or vegetable, the product obtained has organoleptic characteristics of the corresponding fresh fruit or vegetable.

* * * * *